April 16, 1940.   L. SMITH ET AL   2,197,623
BATTERY SUPPORT
Filed Sept. 1, 1938
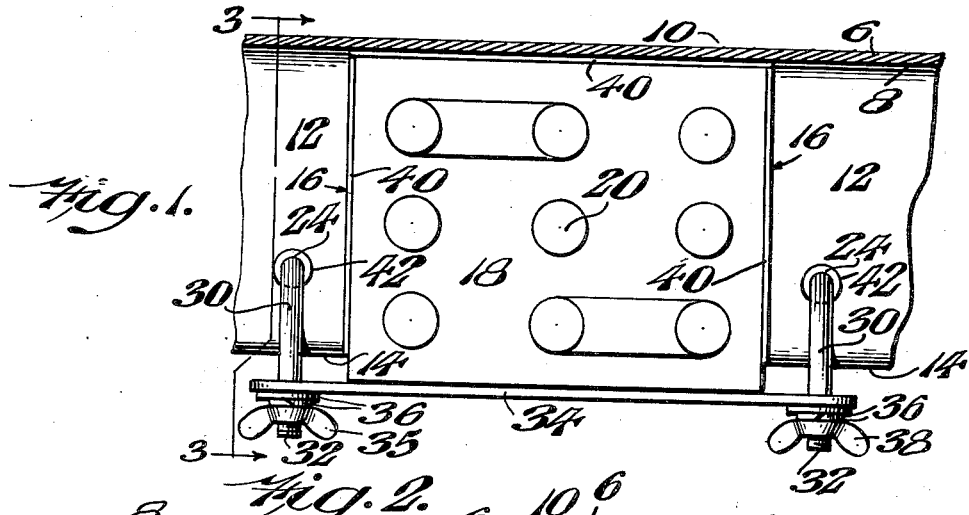
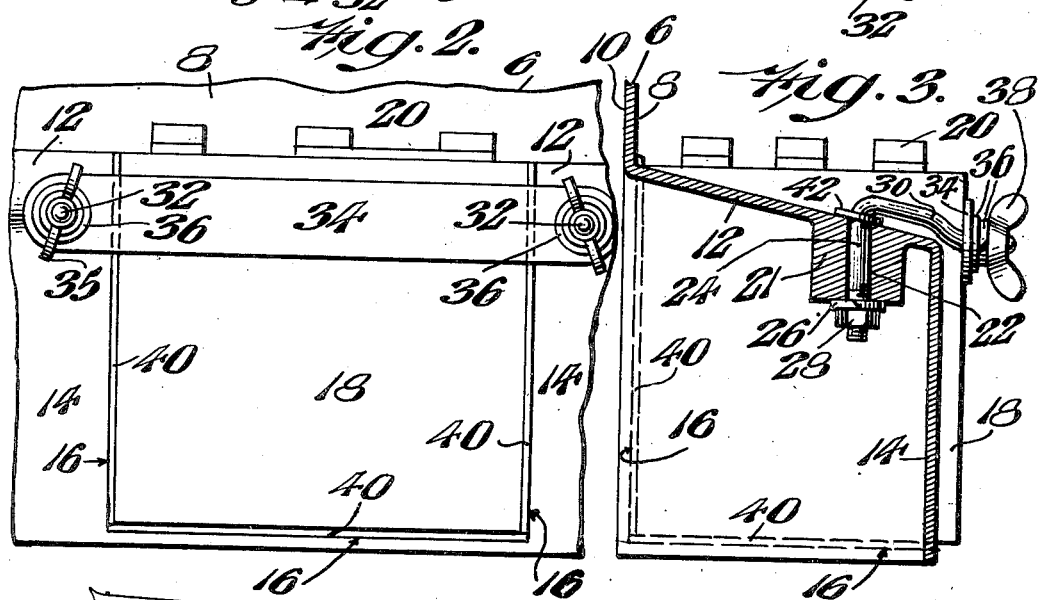
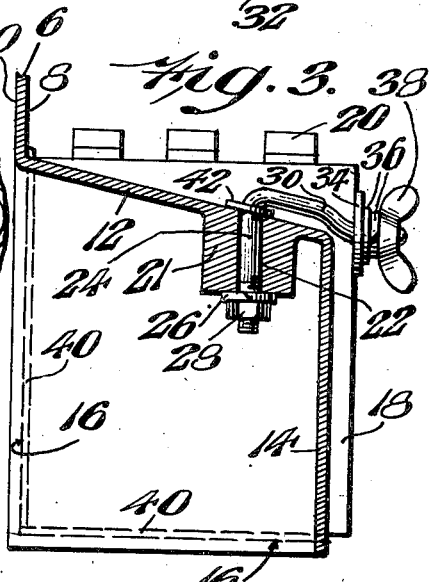
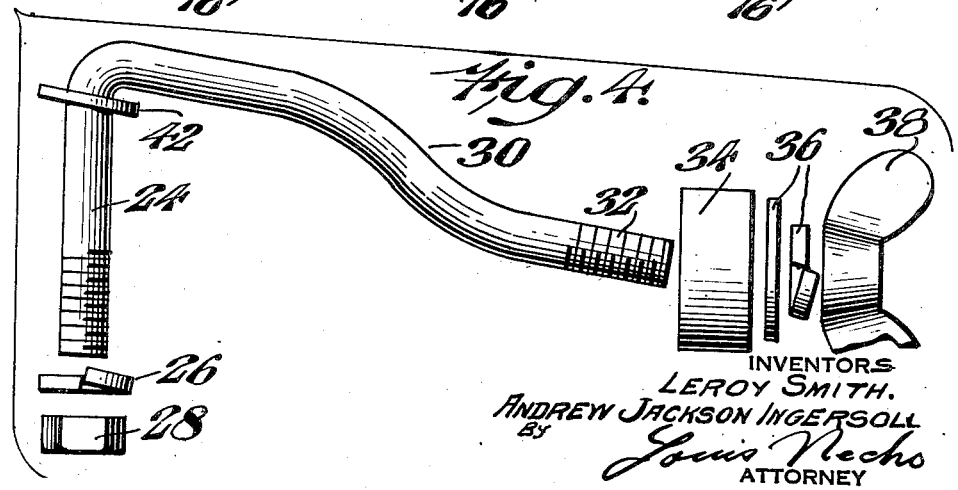
INVENTORS
LEROY SMITH.
ANDREW JACKSON INGERSOLL
BY
Louis Necho
ATTORNEY Patented Apr. 16, 1940

2,197,623

UNITED STATES PATENT OFFICE 2,197,623

BATTERY SUPPORT

Leroy Smith and Andrew Jackson Ingersoll, Wildwood, N. J.

Application September 1, 1938, Serial No. 227,982

1 Claim. (Cl. 180—68.5)

This invention relates to a new and useful battery support and it relates more particularly to a battery support so constructed and positioned as to be substantially immune from contact with the corrosive acid fumes that are constantly emanating from the battery of a motor vehicle or the like.

Heretofore the battery of a motor vehicle has almost universally been positioned under the driver's seat which was a rather inaccessible position, since it necessitated the driver getting out of the vehicle, pushing the seat away, removing the mat on the floor of the car, and then removing the cover plate, etc., all of which greatly discouraged proper attention to the replenishment of the water in the battery and other care which is necessary.

In order to overcome this inconvenience a great many of the automobile manufacturers have resorted to the expedient of placing the battery near the engine where it can be reached by simply raising the hood covering the engine, the usual position of such battery being upon the external surface of the dash-board. In this position the battery was strapped by metallic bands and, due to its proximity to the engine, the heat to which the battery was subjected resulted in excess acid fumes which corroded the supporting band in as short a time as three months thus necessitating replacement.

In order to eliminate this objection this invention contemplates supporting a battery in position on the exterior of the dash-board in a manner which would prevent corrosion of the supporting parts and this is accomplished by making certain of the supporting parts of non-corrosive material such as wood, and by positioning the metallic parts in such a manner as to be out of the way of the acid fumes.

The manner in which this is accomplished will be more clearly understood from the following specification and the accompanying drawing in which:

Fig. 1 represents a view partly in plane and partly in section showing a battery held in position by a support embodying the invention.

Fig. 2 represents a front elevation of Fig. 1.

Fig. 3 represents a section on line 3—3 of Fig. 1.

Fig. 4 represents a composite view in side elevation showing one of the clamping devices forming part of the support.

Referring to the drawing in which like reference characters indicate like parts, 6 designates the dash-board or the wall separating the front end of the body of the vehicle from the engine, and, as viewed in Fig. 3, the surface 8 would be towards the engine and the surface 10 would be towards the body of the vehicle. The dashboard 6 in modern vehicles is provided with the forwardly inclined portion 12 which merges with the vertical, downward extension 14, the walls 12 and 14 defining a well or chamber, which accommodates the brake and clutch pedals, the radio, the heater, etc., and which also affords leg room for the occupants of the front seat of the vehicle. In the inclined portion 12 is formed a recess 16, of a size and shape to accommodate the battery 18 so that the plugs 20 of the battery, which must be removed in order to replenish the water supply, are accessible. On either side of the battery 18 are provided the bosses 21 which have the holes 22 for receiving the vertical, pendant portion 24 of a bolt and nut clamping arrangement best seen in Fig. 4. The lower end of the portion 24, after being inserted through the boss 21, is tightened by means of the lock washer 26 and the nut 28 as clearly seen in Figs. 3 and 4. The body of the bolt is gradually curved downwardly as generally designated at 30 and the end 32 thereof is adapted to pass through an aperture in the end of the cross bar 34 and then to be engaged by the washers 36 and wing nut or the like 38. The bar 34 is made of wood or other material which is unaffected by the acid fumes, and it will be noted that the metallic parts which are shown in Fig. 4 are well below the caps 20 as well as the top of the battery in general, so that, any fumes escaping from the battery will not come in contact with the clamping device of Fig. 4 and cannot affect the cross bar 34.

In order to protect the well 16 formed in the dash-board for accommodating the battery together with adjacent portions of the dash-board from contact with the fumes of the battery, I utilize the insulator 40 which is made of any suitable heat and corrosion-resisting material such as sheet asbestos or the like.

In order to seal the opening through which the vertical portion 24 of the bolt 30 extends we utilize the washer 42 or the like. Also, it will be noted that unlike conventional installations, it is not necessary, when it is desired to remove the battery, for the mechanic to enter the vehicle, since by merely unscrewing the wing nuts 38 the cross-bar 34 can be removed and the battery 18 can be pulled outwardly from the well 16.

The invention having thus been described, what is claimed as new and desired to be covered by Letters Patent is:

A support for a battery of the type described and positioned in a well formed in the body of a motor vehicle and disposed under the engine hood thereof comprising, a wooden bar adapted to extend along the front side of the battery, a pair of arms, there being apertures at either end of said bar through which the front ends of said arms are adapted to project, rear hooks formed on the other ends of said arms for engaging apertures in the body of said vehicle on either side of said well and fastening devices engaging said rear hooks and the front ends of said arms, said arms being deflected to assume a position well below the top of the battery when the support is assembled.

LEROY SMITH.
ANDREW JACKSON INGERSOLL.